United States Patent [19]

Kobari et al.

[11] Patent Number: 4,772,830
[45] Date of Patent: Sep. 20, 1988

[54] METHOD AND APPARATUS FOR CONTROLLING TORQUE OF A SERVOMOTOR

[75] Inventors: Katsuo Kobari, Tachikawa; Toshio Kobayashi, Hino, both of Japan

[73] Assignee: Fanuc Ltd., Minamitsuru, Japan

[21] Appl. No.: 76,681

[22] PCT Filed: Oct. 24, 1986

[86] PCT No.: PCT/JP86/00538
§ 371 Date: Jun. 25, 1987
§ 102(e) Date: Jun. 25, 1987

[87] PCT Pub. No.: WO87/02841
PCT Pub. Date: May 7, 1987

[30] Foreign Application Priority Data

Oct. 25, 1985 [JP] Japan .................. 60-237681

[51] Int. Cl.⁴ .............................................. G05B 9/02
[52] U.S. Cl. ................................. 318/563; 318/565; 425/162; 425/167; 264/40.3
[58] Field of Search ................ 318/560–568, 318/599, 573, 434, 332, 626, 632; 425/141, 167; 264/40.3, 40.7

[56] References Cited

U.S. PATENT DOCUMENTS

| | | | |
|---|---|---|---|
| 3,936,713 | 2/1976 | Hunkar | 425/141 |
| 4,094,481 | 6/1978 | DeWalt | 244/194 |
| 4,531,081 | 6/1985 | Liesegang | 318/632 |
| 4,682,089 | 7/1987 | Tamari | 318/568 |

Primary Examiner—William M. Shoop, Jr.
Assistant Examiner—Brian Young
Attorney, Agent, or Firm—Staas & Halsey

[57] ABSTRACT

Disclosed is a control method in which control errors, attributable to a change of the state of a transmission mechanism, disposed between a servomotor and a load driven thereby, are reduced in controlling a driving force to be applied to the load.

A detected value (PH) of the driving force applied actually to the load is compared with a set value (PL') of the force to be applied to the load. The driving current of the servomotor is controlled in accordance with the result of such comparison. Thereupon, a change of the correlation between the servomotor output and the driving force applied actually to the load, which is attributable to the change of the state of the transmission mechanism, is compensated automatically. Thus, the driving force applied actually to the load is adjusted accurately to the set value.

8 Claims, 5 Drawing Sheets

METHOD AND APPARATUS FOR CONTROLLING TORQUE OF A SERVOMOTOR

TECHNICAL FIELD

The present invention relates to a method and an apparatus for controlling the torque of a servomotor, in which a driving force applied actually to a load driven by the servomotor is controlled directly, and more particularly, to feedback control of a driving force applied to a load in pressure control, robot control, etc., in an injection-molding machine driven by a servomotor, and other systems of control of this type.

BACKGROUND ART

In controlling a driving force applied to a load by using a servomotor, the output torque of the servomotor is conventionally controlled by torque restriction. Since a motor output, however, is generally applied to the load through a transmission mechanism, the driving force applied actually to the load is controlled only indirectly, according to the prior art method of controlling the motor output. This entails the following awkward situations.

Figure 2:
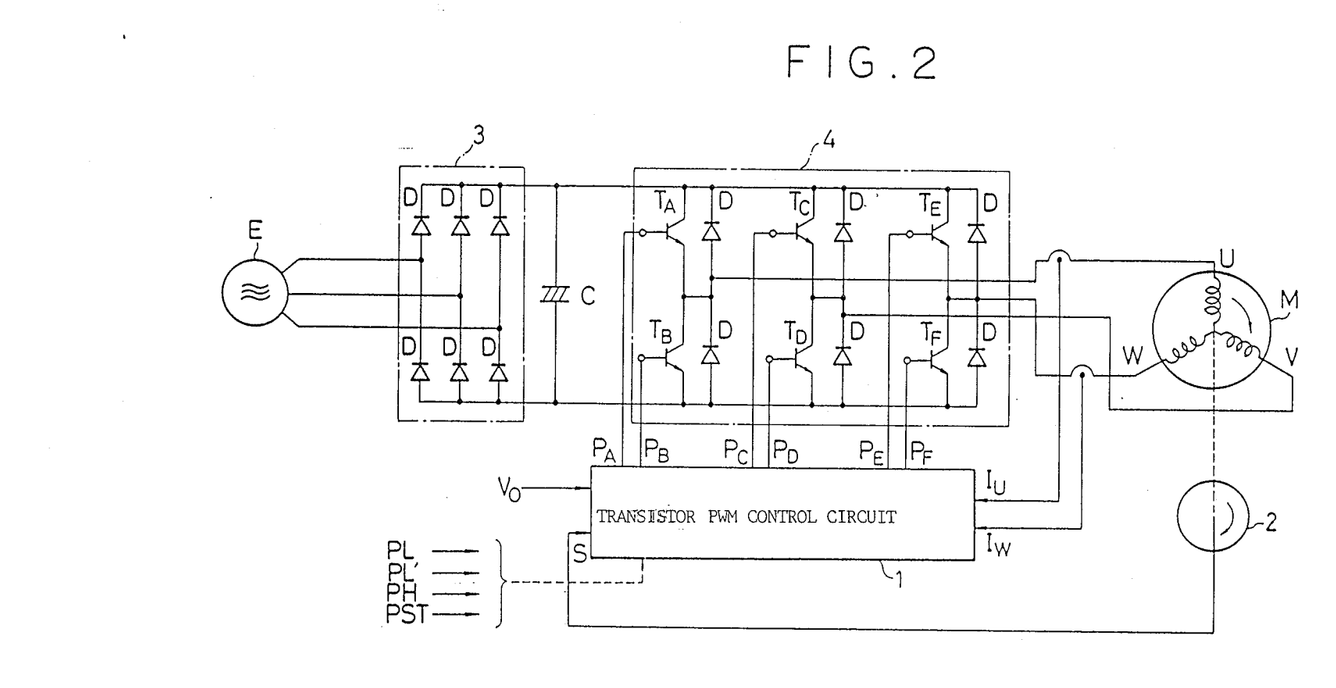
FIG. 2 is a basic circuit diagram of a control circuit of a servomotor including the transistor PWM control circuit of FIG. 1.

FIG. 2 is a block diagram of a basic circuit of a conventional control circuit for controlling a servomotor using a permanent-magnet synchronous motor. In FIG. 2, symbol E designates a three-phase power source. Reference numeral 3 denotes a rectifier circuit; 4, a transistor inverter; and 1, a transistor PWM control circuit. Also, symbol M designates the permanent-magnet synchronous motor, while numeral 2 denotes a rotor position detector, such as a pulse encoder, for detecting the position of a rotor of the permanent-magnet synchronous motor M.

The transistor PWM control circuit 1 compares a speed command value Vo from a control unit with a present speed Vs of the rotor, which is obtained from a rotor position S detected by the rotor position detector 2. Transistors TA to TF of the transistor inverter 4 are turned on or off to control currents flowing through the U-, V-, and W-phase windings of the permanent-magnet synchronous motor M, thereby controlling the rotating speed of the motor M. If the output torque of the motor M is to be controlled, the transistor PWM control circuit 1 is arranged as shown in FIG. 3.

Figure 3:
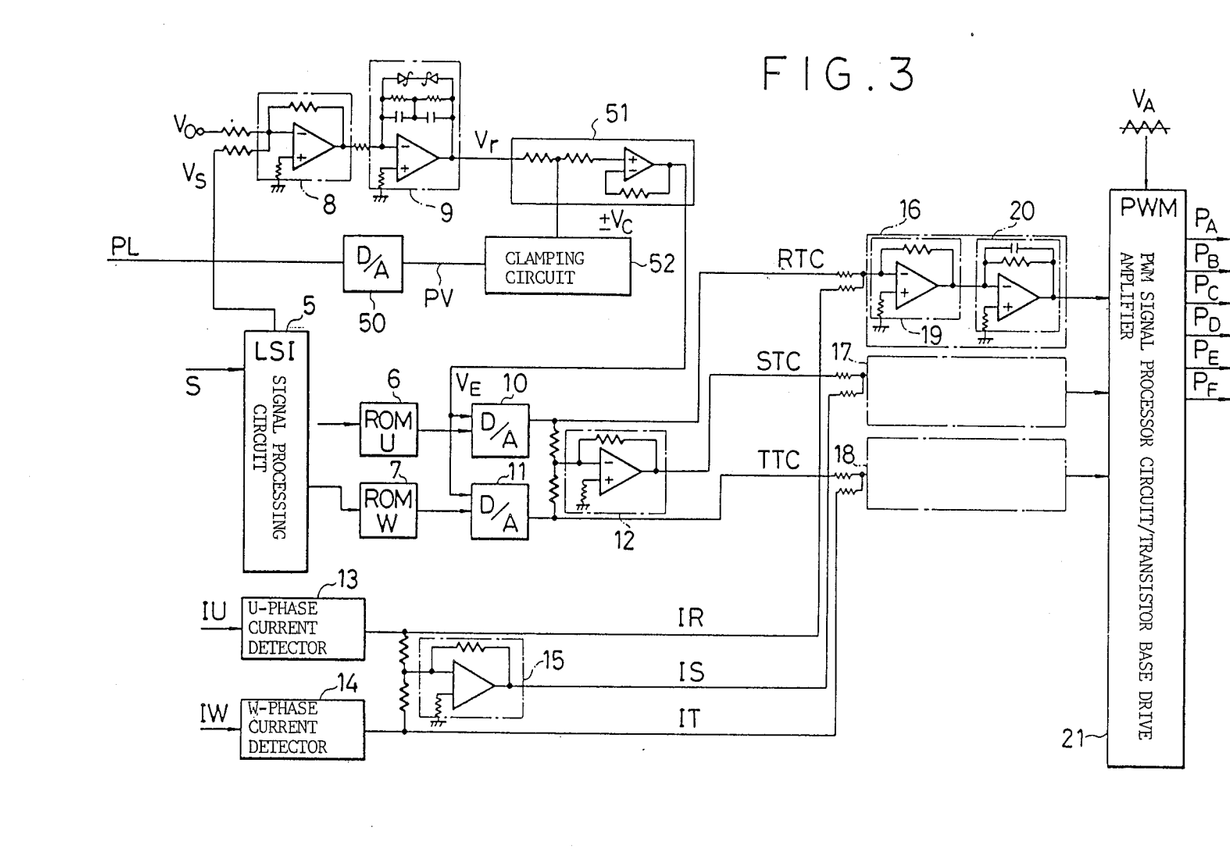
FIG. 3 is a block diagram of a transistor PWM control circuit for a conventional method of torque restriction.

In FIG. 3, numeral 5 denotes a signal processing circuit; 6 and 7, ROMs; and 8, a differential amplifier. The signal processing circuit 5 delivers a voltage Vs, indicative of the present rotor speed, in accordance with the rotor position detection output S. The ROMs 6 and 7 store a group of U- and W-phase command values to be delivered, so as to correspond to individual rotor positions, in order to make the phase of the resultant current, flowing in the U, V, and W phases, perpendicular to that of the main flux of a magnetic field generated by the rotor. The differential amplifier 8 amplifies the difference between the voltage Vo, indicative of the speed command, and the voltage Vs, indicative of the present speed, from the signal processing circuit 5, and delivers an amplified difference signal. Numeral 9 denotes a filter which has a frequency characteristic such that the gain is lowered at high frequencies, and is increased at low frequencies. Zener diodes ZD1 of the filter 9 serve to clamp the peak voltage. Numerals 50 and 52 designate a D/A converter and a clamping circuit, respectively. The D/A converter 50 serves to convert a torque limiting command PL, as a digital signal, into an analog signal. The command PL, which is supplied from a numerical control unit (not shown) or the like, is used to set the value of the driving force to the load. If an input Vr to an amplifier 51, that is, a voltage Vr corresponding to the difference between the speed command Vo from the filter 9 and the present speed Vs, exceeds a predetermined voltage +Vc or −Vc, which corresponds to a torque limiting command PV, in the form of an analog signal, from the D/A converter 50, the clamping circuit 52 clamps the voltage Vr to the voltage +Vc or −Vc. Numerals 10 and 11 denote multiplying digital-to-analog converters. The converter 10 multiplies a voltage VE, delivered from the amplifier 51, by the U-phase command value delivered from the ROM 6. Likewise, the converter 11 multiplies the voltage VE by the W-phase command value from the ROM 7. Thus, the converters 10 and 11 generate U- and W-phase current commands RTC and TTC, respectively. Numeral 12 denotes an adder for adding the U- and W-phase current commands RTC and TTC and generating a V-phase current command STC, which is shifted from the U and W phases by 120°. Numerals 13 and 14 denote detectors for detecting currents Iu and Iw flowing through the U- and W-phase armature windings of the synchronous motor M. Numeral 15 denotes an adder for adding U- and W-phase currents IR and IT, detected by the U- and W-phase current detectors 13 and 14, to calculate V-phase current IS. Numerals 16, 17 and 18 denote circuits for delivering the current command voltages, which are indicative of the currents to be supplied to the U-, V-, and W-phase armature windings. The circuits 16, 17 and 18 are constructed in the same manner, provided that they are supplied with different input signals. The circuit 16 comprises an operational amplifier 19 for amplifying the difference between the U-phase current command RTC and the present U-phase detection current IR, and a low-pass filter 20 for transmitting only the frequency component of the reference carrier wave, as an output from the operational amplifier 19. The circuit 17 receives the V-phase current command STC and the present current IS, while the circuit 18 receives the W-phase current command TTC and the present current IT. As regards other arrangements, the circuits 17 and 18 are identical with the circuit 16. Numeral 21 denotes a circuit (hereinafter referred to as a PWM signal processing circuit) which is composed of a PWM signal processor and a transistor base drive amplifier. The PWM signal processing circuit 21 compares the signals from the circuits 16, 17 and 18 with the reference carrier wave VA, and generates PWM signals PA to PF for turning on and off the transistors TA to TF of the transistor inverter 4.

With the arrangement described above, the permanent-magnet synchronous motor M is controlled as follows. The difference between the speed command Vo and the present speed Vs, which is generated from the signal processing circuit 5 supplied with the rotor position signal S from the rotor position detector 2, is amplified by the differential amplifier 8, and is delivered as an output voltage Vr through the filter 9. If the voltage Vr is not higher than the clamping voltage +Vc or −Vc set by the clamping circuit 52, it is delivered directly, as an output VE, from the amplifier 51. If the voltage Vr is higher than the clamping voltage +Vc or −Vc, the clamping voltage is delivered as the output voltage VE (=+Vc or −Vc) of the amplifier 51, and is supplied to the multiplying digital-to-analog converters 10 and 11. After receiving an address signal, indicative of the present rotor position, from the signal processing circuit 5, the U- and W-phase ROMs 6 and 7 supply the multiplying digital-to-analog converters 10 and 11 with U- and W-phase command values corresponding to the present rotor position. The multiplying digital-to-analog converters 10 and 11 multiply the error signal VE by the command values from the ROMs 6 and 7, respectively, and generate U- and W-phase current commands RTC and TTC, respectively. The adder 12 adds the U- and W-phase current commands RTC and TTC, thereby delivering the V-phase current command STC. Operational amplifiers 19 in the circuits 16, 17 and 18 amplify the differences between the current commands RTC, STC, and TTC and the present U-, V-, and W-phase current values IR, IS, and It detected by the U- and W-phase current detectors 13 and 14 and the adder 12. The amplified signals are filtered by the filters 20, and voltages corresponding to the individual phase command currents are delivered to the PWM signal processing circuit 21. The circuit 21 compares the voltages with the reference carrier wave VA, and delivers the PWM signals PA to PF to the transistor inverter 4 through the transistor base drive amplifier. Thus, the transistors TA to TF of the transistor inverter are turned on and off to control the speed of the permanent-magnet synchronous motor M.

For example, an injection mechanism of an injection-molding machine may be driven by means of the permanent-magnet synchronous motor M, under the aforementioned speed control, so that resin is injected by means of a screw, and is subjected to pressure maintenance thereafter. In doing this, the pressure to be maintained has conventionally been controlled by controlling the output torque of the motor M, i.e., the driving current of the motor. In this case, if the torque limiting command PL, which is necessary for the pressure maintenance, is delivered from the numerical control unit or other control unit, the command PL is converted into an analog signal by the D/A converter 50, as mentioned before, and the clamping circuit 52 sets the clamping voltages +Vc and −Vc corresponding to the torque limiting command PL. When the injection ends, the screw of the injection mechanism ceases to move, and the motor M nearly stops from rotating, so that the difference between the voltage Vs, indicative of the present speed, and the voltage Vo for the speed command becomes large. As a result, the output voltage Vr from the filter 9 exceeds the set clamping voltage +Vc or −Vc, so that the amplifier 51 delivers the voltage VE corresponding to the set clamping voltage +Vc or −Vc to the multiplying digital-to-analog converters 10 and 11. Consequently, the U- and W-phase current commands RTC and TTC from the multiplying digital-to-analog converters 10 and 11 and the V-phase current command STC from the adder 12 take their respective values corresponding to the set clamping voltage +Vc or −Vc. Thus, the motor M delivers an output torque set in accordance with the torque limiting command PL. The output torque of the motor M can be varied by changing the value of the torque limiting command PL. In the pressure control for the injection-molding machine, therefore, the pressure to be maintained is varied in several steps by multistep setting of the torque limiting command PL.

However, the conventional control method, which is an open-loop method, is based only on the supposition that a driving force corresponding to torque restriction is applied to the load by effecting the torque restriction. More specifically, a torque delivered from the shaft of the servomotor is transmitted through a transmission mechanism or the like, to be supplied as a driving force to a load, e.g., a screw for injection and pressure maintenance. Due to various disturbances, such as friction on the transmission mechanism, etc., or deflection or the like of a spring or ball screw, the force applied actually to the load does not always agree with the value set by torque restriction. In the injection-molding machine driven by the servomotor, if the pressure control is performed by torque restriction, as in the aforementioned case, a difference may often be produced between the set pressure to be applied to the resin and the pressure applied actually to the resin, due to friction on the transmission mechanism or the like.

DISCLOSURE OF THE INVENTION

It is an object of the present invention to provide a method of directly controlling the driving force applied actually to a load, in applying the torque of a servomotor to the load through a transmission mechanism.

In order to achieve the above object of the present invention, there is provided a method and an apparatus for controlling the output torque of a servomotor by limiting the torque by means of torque limiting means, in which a driving force applied to a load, through a transmission mechanism, by the servomotor is detected, the detected value is compared with a set value of the driving force to be applied to the load, and the torque limiting means is driven in accordance with the difference between the detected value and the set value, to control the driving current of the servomotor.

According to the present invention, as described above, the driving force applied actually to the load driven by the servomotor is detected, and is then feedback-controlled to a target value by the torque limiting means. In driving the load by means of the servomotor through the medium of the transmission mechanism, therefore, if the correlation between the output torque of the servomotor and the driving force applied to the load varies, due to friction on the transmission mechanism or deflection of the spring or ball screw, the torque limiting means is operated so that the driving force applied actually to the load is fed back and adjusted to the set point. Thus, the variation of the correlation can be compensated automatically, so that the driving force can be adjusted accurately to the set point.

BEST MODE OF CARRYING OUT THE INVENTION

Figure 1:
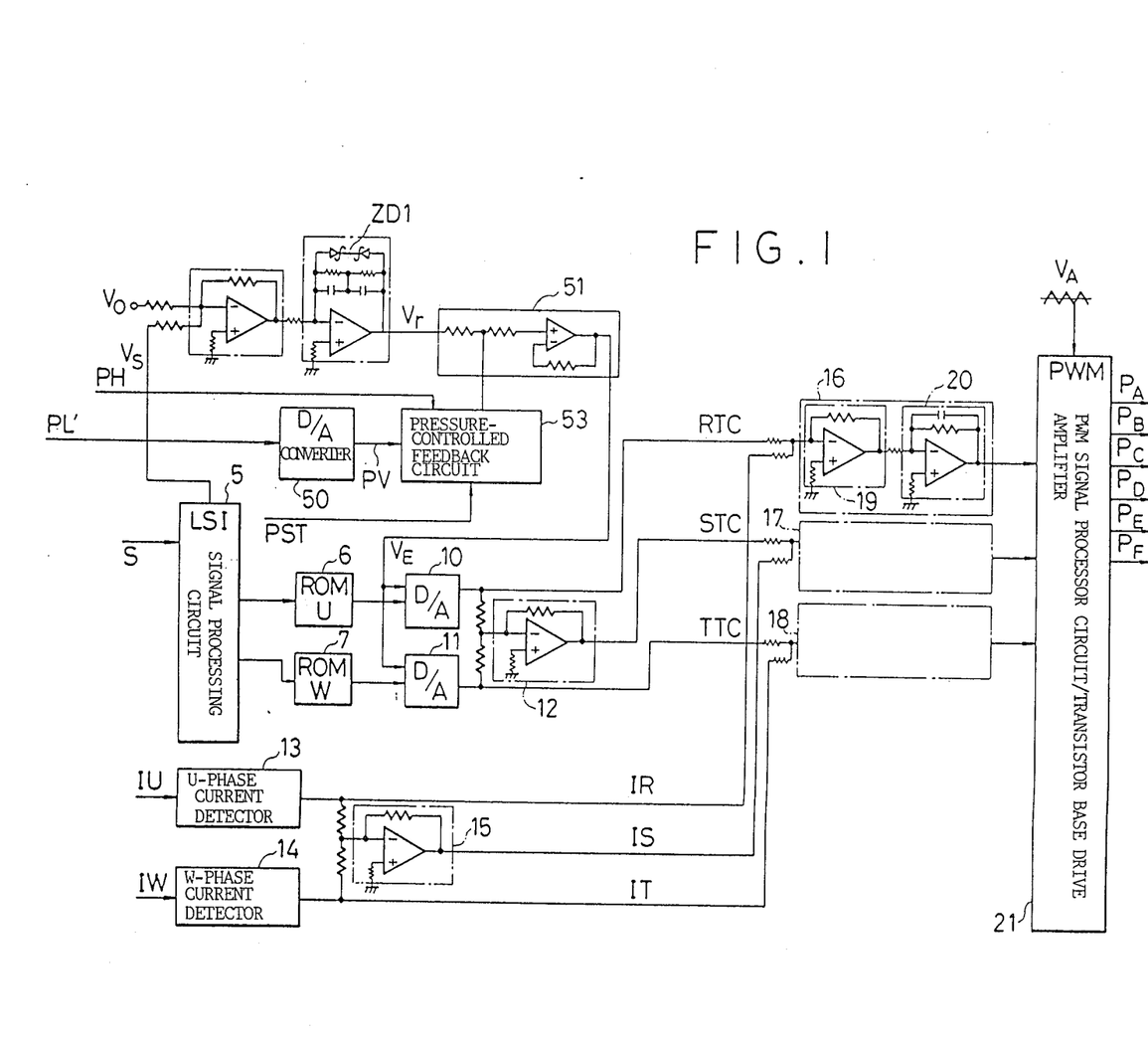
FIG. 1 is a block diagram showing a transistor WM control circuit according to an embodiment of the present invention.
Figure 4:
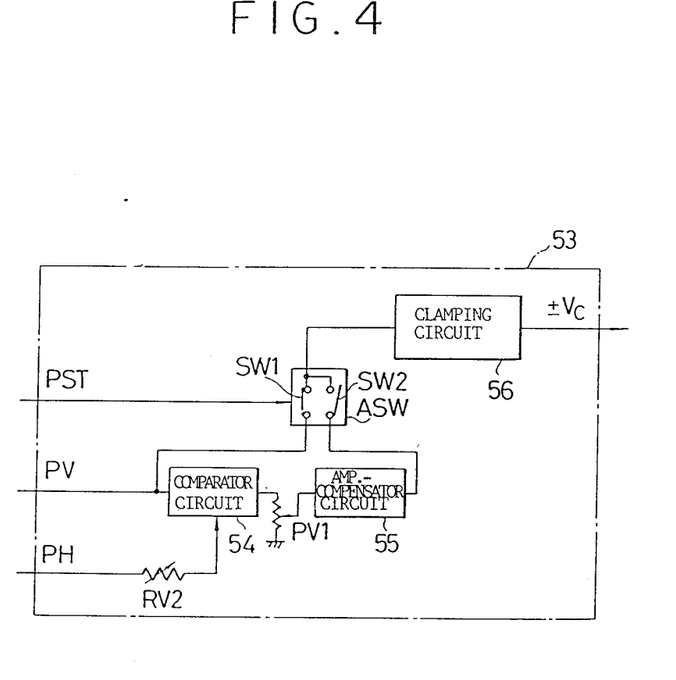
FIG. 4 is a block diagram of a pressure-control feedback circuit.

FIG. 1 shows a transistor PWM control circuit 1' according to an embodiment of the present invention, which is used as the transistor PWM control circuit 1 in the basic circuit diagram shown in FIG. 2. The control circuit 1' of FIG. 1 differs from the conventional transistor PWM control circuit 1 for torque restriction, shown in FIG. 3, in that it uses a pressure-controlled feedback circuit 53 in place of the clamping circuit 52 of FIG. 3. FIG. 4 is a block diagram of the pressure-controlled feedback circuit 53, and FIG. 5 is a detailed circuit diagram thereof.

Figure 5:
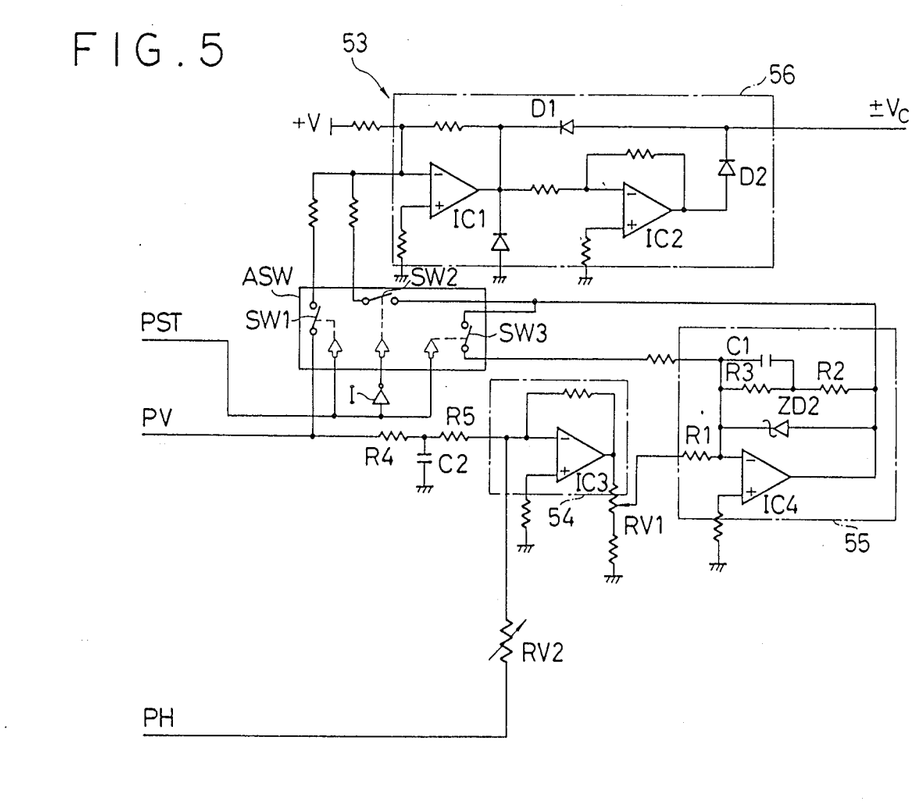
FIG. 5 is a diagram for illustrating the pressure-control feedback circuit.

In FIGS. 1, 4 and 5, symbol PST designates a switching command signal, which is used to determine whether or not the driving force applied actually to the load by the motor M is to be controlled by a feedback control loop (mentioned later). In response to the signal PST, an analog switch ASW is shifted. Symbol PV designates a driving force command voltage ($\leq 0$) which is obtained by converting a driving force command PL' into an analog signal by means of the D/A converter 50 shown in FIG. 1. The command PL', which is supplied from a control unit, corresponds to the driving force to be applied to the load. Symbol PH designates a detection load pressure voltage which is indicative of the driving force or pressure applied actually to the load. The voltage PH is supplied from a pressure detector (not shown) or the like which is attached to the load.

In FIG. 4, numeral 54 denotes a comparator circuit, which compares the driving force command voltage PV from the D/A converter 50 with the feedback signal from the pressure detector, and delivers an output indicative of the difference between the voltage PV and the signal PH. Numeral 55 denotes an amplifier-compensator circuit, which receives the output from the comparator circuit 54 through a volume control RV1 for determining the gain of pressure feedback. The amplifier-compensator circuit 55 amplifies the output from the comparator circuit 54, and delivers its output. Symbol ASW designates the analog switch, which is shifted in response to the switching command signal PST for the determination on the feedback control of the force applied to the load. Numeral 56 denotes a bipolar clamping circuit, which delivers the clamping voltage +Vc or −Vc to the amplifier 51 (see FIG. 1), in response to a voltage applied to the circuit 56, and clamps the output Vr from the filter 9 to the clamping voltage +Vc or −Vc. Symbol RV2 designates a volume control for compensating the detection signal from the pressure detector.

The operation of the aforementioned control circuit will now be described in connection with a case such that an injection mechanism of an injection-molding machine, for example, is driven by means of the motor M for pressure control.

During injection, the torque restriction is not executed, that is, the driving force command PL' from the control unit is set to its maximum, and a maximum voltage (e.g., −10 V) is delivered from the output PV of the D/A converter 50. Since no pressure feedback is performed, the switching command signal PST is not generated, so that the analog switch ASW is in the state shown in FIG. 4. In this state, the driving force command voltage PV is applied directly to the clamping circuit 53, and the maximum voltage +Vc or −Vc is delivered from the clamping circuit 53. In consequence, as mentioned before, the difference between the speed command voltage Vo and the voltage Vs, indicative of the present speed, is delivered through the differential amplifier 8 and the filter 9. The voltage Vr is supplied to the multiplying digital-to-analog converters 10 and 11 through the amplifier 51, without being limited by the clamping circuit 56. Thus, the motor M is driven only under speed control, without torque restriction, to accomplish injection control.

Subsequently, when a step of pressure maintenance is reached after the end of the injection process, the switching command signal PST is delivered, so that the analog switch ASW is shifted so that switches SW1 and SW2 are turned off and on, respectively. Meanwhile, the driving force command (hereinafter referred to as the pressure maintenance command) PL' corresponding to a first step of pressure maintenance is delivered from the control unit, and the voltage PV corresponding to the command PL' is supplied from the D/A converter 50 to the comparator circuit 54. The comparator circuit 54 compares the voltage PV with the load pressure voltage PH ($\geq 0$), as a detection signal, from the pressure detector (not shown) or the like which is provided in a die. The difference between the voltages PV and PH is delivered to the amplifier-compensator circuit 55 via the volume control RV1. Then, the output of the amplifier-compensator circuit 55 is applied to the clamping circuit 56 through the switch SW2 of the analog switch ASW. Thereupon, the clamping circuit 56 delivers the clamping voltage +Vc or −Vc in accordance with the difference between the pressure maintenance command voltage PV and the load pressure voltage PH from the pressure detector.

During the pressure maintenance, a screw of the injection mechanism (not shown) is substantially stopped from moving, and the motor M is also stopped. However, the speed command Vo keeps on being generated, so that the voltage Vr delivered from the filter 9 is determined by the set point of the Zener diodes ZD1. Thus, the filter 9 delivers the voltage Vr which causes the motor M to produce its maximum driving force. Accordingly, the input of the amplifier 51 is clamped at the clamping voltage +Vc or −Vc of the clamping circuit 56, so that the voltage VE corresponding to the clamping voltage +Vc or −Vc is delivered to the multiplying digital-to-analog converters 10 and 11. Thus, the output torque of the motor M can be controlled in accordance with the clamping voltage +Vc or −Vc, or the value of the maintenance command PL'.

If the difference between the voltage PV, corresponding to the pressure maintenance command PL', and the load pressure voltage PH from the pressure detector is large, the output of the amplifier-compensator circuit 55 is large, so that the voltage applied to the clamping circuit 56 is high. Accordingly, the clamping voltage +Vc or −Vc increases, so that the phase current commands RTC, TTC, and STC, delivered from the multiplying digital-to-analog converters 10 and 11 and the adder 12, respectively, are augmented, and the output torque of the motor M increases. If the load pressure PH, as the detection signal from the pressure detector, increases so that its difference from the command voltage PV becomes smaller, the output of the amplifier-compensator circuit 55 is lowered. Accordingly, the output +Vc or −Vc of the clamping circuit 56 is also lowered, and the output torque of the motor M is reduced. As a result, the difference between the command voltage PV and the load pressure voltage PH from the pressure detector is settled at a fixed value. This indicates that the pressure of the resin in the die, as the load, is stabilized when it reaches the pressure maintenance delivered from the control unit, that is, the target pressure for pressure maintenance. Thus, if the torque is absorbed from the motor M by friction on the transmission system or deflection of the spring or ball screw, the pressure inside the die is compared directly with the command pressure for pressure maintenance, and feedback control is performed so that the internal pressure of the die is adjusted to the set pressure. Accordingly, there will be caused no such errors as conventional ones. In the pressure maintenance, which is performed in several steps, the pressure to be maintained can be changed automatically to the set pressure in each pressure maintenance step by changing the pressure maintenance command PL' and hence the command voltage PV.

FIG. 5 is a specific circuit diagram of the pressure-controlled feedback circuit 53, in which the comparator circuit 54 is composed of an operational amplifier IC3, and the amplifier-compensator circuit 55 includes an operational amplifier IC4, a Zener diode ZD2 for clamping the output to a fixed voltage, and a capacitor C1 and resistors R1 to R3 for stabilizing pressure feedback. The analog switch ASW includes three switches SW1 to SW3. Symbol I designates an inverter. The switches SW1 and SW3 are turned on and off synchronously in association with each other. The switch SW2 is turned on and off oppositely to the switches SW1 and SW3. More specifically, when the switching command PST is at low level (TTL logic level), the switches SW1 and SW3 are on, and the switch SW2 is off. If the level of the command PST goes high, the switches SW1 and SW3 are turned off, and the switch SW2 is turned on. The clamping circuit 56 is composed of two operational amplifiers IC1 and IC2, diodes D1 and D2, etc. The operational amplifiers IC1 and IC2 constitute an amplifier and a code converter, respectively. A negative voltage applied to the operational amplifier IC1 (pressure maintenance command voltage PV and the output voltage of the amplifier-compensator circuit 55 are negative voltages) is amplified and delivered as a positive voltage by the operational amplifier IC1. This output voltage serves as the positive clamping voltage +Vc. The operational amplifier IC2, for use as the code converter, converts the voltage +Vc into a negative voltage −Vc, thus generating the negative clamping voltage −Vc. When the output Vr (see FIG. 1) of the filter 9 reaches the level of the positive clamping voltage +Vc or a higher level, the diode D1 starts to conduct, and the input of the amplifier 51 is kept below the level of the clamping voltage +Vc. When the output Vr of the filter 9 is lowered to the level of the negative clamping voltage −Vc or a lower level, on the other hand, the diode D2 starts to conduct, and the input of the amplifier 51 is kept above the level of the negative clamping voltage −Vc.

Resistors R4 and R5 and a capacitor C2 constitute an integration circuit, which serves to lessen the change of the voltage PV (step voltage). The switch SW3 of the analog switch ASW is adapted to short the capacitor C1 to discharge the same when it is turned on.

The operation of the aforementioned circuit will now be described. When the pressure feedback control is off, the switching signal PST is at low level. In this state, the switches SW1 and SW3 of the analog switch ASW are on, and the switch SW2 is off, as shown in FIG. 5. Thus, the pressure maintenance command voltage PV is applied to the clamping circuit 56. In starting the pressure feedback control or pressure control, on the other hand, the switching signal PST is shifted to high level, the switch SW2 is turned on, and the switches SW1 and SW3 are turned off. When the pressure maintenance command voltage PV (<0) is applied to the operational amplifier IC3 of the comparator 54, it is compared with the voltage PH (>0) which is delivered from the pressure detector and corrected by means of the volume control RV2. The difference between the voltages PV and PH is delivered from the comparator 54, and is supplied to the operational amplifier IC4 via the volume control RV1 which is used to determine the amplification degree. Immediately after the start of the pressure feedback control, the detected pressure from the pressure detector is unstable. In a transient state such that the pressure maintenance command voltage PV changes, moreover, the capacitor C1 is shorted for a short period of time, so that the gain of the operational amplifier IC4 serves as an inverted amplifier having a low gain determined by −R2/R1. When the capacitor C1 finishes being charged, the gain of the operational amplifier IC4 reaches a high level of −(R2+R3)/R1. Thus, in a transient state such that the voltage applied to the operational amplifier IC4 varies, the gain is lowered. As the voltage becomes stable, the gain is increased, and the clamping voltage +Vc or −Vc is changed gradually, thereby improving the stability of the pressure feedback control.

In the embodiment described above, the torque control method of the present invention is applied to the pressure control in an injection-molding machine which uses a servomotor as the drive source of its injection mechanism. However, the present invention may be applied also to various other systems of control than the pressure control for such an injection-molding machine. According to such alternative control systems, a force applied actually to a load can be detected for the control of the force on the load.

In the above embodiment, moreover, an AC servomotor using a synchronous motor is described as being subjected to torque control. The present invention may, however, be applied also to the torque control of a DC servomotor.

We claim:

1. A method of controlling the output torque of a servomotor by adjusting the driving current of the servomotor to be less than or equal to a limited value by torque limiting means, a torque control method for the servomotor comprising the steps of:
    (a) detecting a driving force actually applied to a load, through a transmission mechanism, by the servomotor, a relation between the actually applied driving force and the output torque being permitted to vary due to a change in the condition of the transmission mechanism;
    (b) comparing a detected value of the driving force with a set value of the driving force to be applied to the load; and
    (c) driving the torque limiting means in accordance with the difference between the detected value and the set value, for controlling the driving current of the servomotor, thereby adjusting the driving force actually applied to the load to the set value by feedback control, a change in the relation between the actually applied driving force and the output torque can be automatically compensated when the change occurs.

2. A torque control method for a servomotor according to claim 1, further comprising the steps of:
(d) lowering a gain on the feedback control while the difference between the detected value and the set valued of the driving force is varying; and
(e) increasing the gain on the feedback control when the difference is stable, thereby stabilizing the feedback control.

3. A torque control method for a servomotor according to claim 1 or 2, further comprising the sub-steps of:
(i) using the servomotor as a drive source for an injection mechanism of an injection-molding machine; and
(ii) detecting a pressure applied to a resin for maintaining pressure, so that the torque limiting means is driven in accordance with the difference between the detected pressure and a set pressure as a target value, thereby effecting pressure maintenance control.

4. A torque control apparatus for controlling an output torque of a servomotor, comprising:
a load;
a transmission mechanism connected to said load;
signal porcessing circuit means, for receiving a signal indicative of an actual rotational position of the servomotor, operatively connected to said transmission mechanism, for delivering an actual speed signal and a driving-current command signal corresponding to an actual rotational position of the servomotor;
first comparator means for outputting the difference between the actual speed signal and a speed command signal;
compensator means for compensating the driving-current command signal from said signal processing circuit means with the output from said first comparator means;
feedback circuit means including clamping means for clamping the output from said first comparator means to a predetermined value corresponding to the difference between a driving-force command signal, indicative of the driving force to be applied to said load, and a driving-force feedback signal, indicative of a driving force acutally applied to said load, a change in the relationship between the actually applied driving force and the output torque is automatically compensated; and
driver means for driving the servomotor in accordance with a detection driving current and the driving-current command signal compensated by said compensator means.

5. A torque control apparatus for a servomotor according to claim 4, wherein said feedback circuit means includes:
second comparator means for comparing the driving-force command signal and the driving-force feedback signal and delivering an output corresponding to the result of said comparison; and
amplifier-compensating means connected to said second comparator means, for amplifying the output from said second comparator means and supplying the amplified output to said clamping means.

6. A torque control apparatus for a servomotor according to claim 5, wherein said feedback circuit means includes changeover switch means for alternatively connecting said clamping means to an input side of said second comparator means and an output side of said amplifier-compensator means.

7. A torque control apparatus for a servomotor according to claim 5, wherein said amplifier means of said feedback circuit means includes:
an operational amplifier;
a plurality of resistors, connected to said operational amplifier, for determining the gain of said operational amplifier; and
a capacitor causing a short across at least one of said resistors when charged, in a transient state such that the driving force command signal changes, thereby reducing the gain of said operational amplifier.

8. A torque control apparatus for a servomotor, including a load and a transmission mechanism connected to the load, said torque control apparatus comprising:
signal processing circuit means, for receiving a signal indicative of an actual rotational position of the servomotor, operatively connected to the transmission mechanism, for delivering an actual speed signal and a driving current command signal corresponding to an actual rotational position of the servomotor;
first comparator means for outputting the difference between the actual speed signal and a speed command signal;
compensator means for compensating the driving current command signal from said signal processing circuit means with the output from said first compensator means;
feedback circuit means including:
clamping means, connected to said first comparator means, for clamping the output from said first comparator means to a predetermined value corresponding to the difference between a driving force command signal, indicative of the driving force to be applied to the load, and a driving force feedback signal, indicative of a driving force actually applied to the load;
second comparator meand for comparing the driving force command signal and the driving force feedback signal and delivering an output corresponding to the result of said comparison; and
amplifier means, connected to said second comparator means, for amplifying the output from said second comparator means and supplying the amplified output to said clamping means, said amplifier means comprising:
an operational amplifier;
a plurality of resistors, connected to said operational amplifier, for determining the gain of said operational amplifier; and
a capacitor causing a short across at least one of said resistors when charged, in a transient state such that the driving force command signal changes, thereby reducing the gain of said operational amplifier; and
driver means for driving the servomotor in accordance with a detection driving current and the driving-current command signal compensated by said compensator means.

* * * * *

UNITED STATES PATENT AND TRADEMARK OFFICE
CERTIFICATE OF CORRECTION

PATENT NO. : 4,772,830
DATED : SEPTEMBER 20, 1988
INVENTOR(S) : KATSUO KOBARI ET AL.

It is certified that error appears in the above-identified patent and that said Letters Patent is hereby corrected as shown below:

Col. 3, line 17, "It" should be --IT--.

Col. 9, line 7, "valued" should be --value--.

Signed and Sealed this

Seventh Day of March, 1989

Attest:

DONALD J. QUIGG

Attesting Officer

Commissioner of Patents and Trademarks